Jan. 17, 1967 B. T. GODA 3,299,295

PULSING CIRCUIT PROVIDING OUTPUT PULSES WHICH ARE INHIBITED UPON INPUT PULSES EXCEEDING PREDETERMINED RATE

Filed Dec. 7, 1964

INVENTOR
BEN TSUTOMU GODA

United States Patent Office 3,299,295
Patented Jan. 17, 1967

3,299,295

PULSING CIRCUIT PROVIDING OUTPUT PULSES WHICH ARE INHIBITED UPON INPUT PULSES EXCEEDING PREDETERMINED RATE

Ben T. Goda, Gardena, Calif., assignor to Electronic Memories, Incorporated, Hawthorne, Calif., a corporation of California Filed Dec. 7, 1964, Ser. No. 416,381
8 Claims. (Cl. 307—88.5)

This invention relates to controlled pulsing circuitry and, more particularly, to an improved circuit for controlling the characteristics of pulses produced therein.

Presently, pulsing techniques are extensively employed in many electronic systems and circuits. Generally, a chain of pulses is used to control the mode of operation of a particular circuit. The pulses may vary from one another in their time durations, and in addition, changes in the rate at which the pulses are generated may occur. In some cases, these two pulse characteristics, namely, pulse time duration also referred to as pulse width, and the pulse rate need be carefully controlled in order to prevent damage to various components, and thereby insure satisfactory operation.

Such requirements are particularly present when employing transistorized circuits which, though capable of reliable operations under normal pulsing conditions, need be protected from pulses with excessive pulse width, as well as, from pulses generated at too high a rate or duty cycle. For example, presently known high-powered transistor driver circuits are designed to provide extremely high peak power under normal pulsing conditions. However, such circuits cannot sustain these peak power loads under excessive pulse rates, or when energized by pulses of excessive pulse widths without dissipating excessive power in the output transistors, and thereby endangering their satisfactory operation. Therefore, the reliability of operation of such circuits can only be insured if the rate at which pulses are supplied thereto, as well as the pulse width of each of the pulses, can be controlled to insure that the circuits are not subjected to adverse pulsing conditions.

Similar requirements to control the pulse width and rate characteristics of a chain of pulses exist in various other circuits, such as pulse generators and in general, in any circuit employing transistors which need to be protected from dissipating excessive power, which is generally detrimental to their performance.

Accordingly, it is an object of the present invention to provide a circuit for generating output pulses of limited pulse width.

Another object of the present invention is the provision of a circuit wherein output pulses are produced in response to input pulses only when the rate or duty cycle of the input pulses does not exceed a predetermined limit.

Yet, another object of the present invention is to provide a circuit for generating output pulses in response to input pulses. The time width of each output pulse is generally controlled by the time width of one of the input pulses, however, the time width of the output pulse is not to exceed a predetermined limit.

A further object of the present invention is to provide a novel and simple transistorized pulsing circuit energized by a plurality of input pulses to produce output pulses. The pulse width of each output pulse is related to the pulse width of one of the input pulses but does not exceed a predetermined pulse width. The output pulses are produced only when the rate of the input pulses does not exceed a predetermined value.

These and other objects of the present invention are achieved in a pulsing circuit comprising an input stage energized by a chain of input pulses, and an output stage coupled thereto through two intermediary stages. One of the intermediary stages controls the output stage to insure that the width of each output pulse does not exceed a predetermined limit. The other intermediary stage senses the rate at which the input pulses are supplied. Whenever such rate or duty cycle exceeds a selected value, the output stage is inhibited or disabled from further providing any output signals. Thus, the output stage is controlled by limiting the maximum width or time duration of each of the output pulses produced thereby, and is further controlled by being prevented from producing any output pulses whenever the rate of the input pulses exceeds a predetermined duty cycle.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
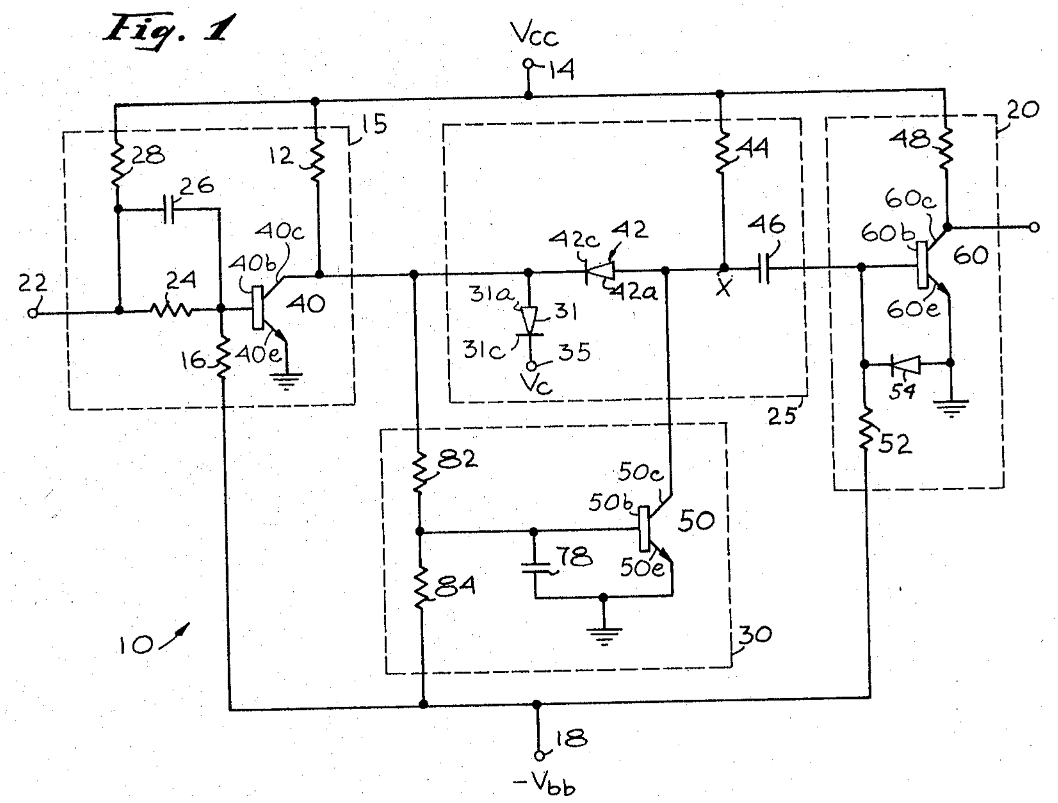
FIGURE 1 is a schematic diagram of the present invention.

Reference is now made to FIGURE 1 which is a schematic diagram of the circuit of the present invention. As seen, a pulsing circuit 10 comprises an input stage 15 and an output stage 20. Interposed between these two stages are two control stages 25 and 30. Stage 25 controls the maximum width of each pulse produced by the output stage 20, to insure that it equals the width of the input pulse related thereto, but does not exceed a maximum selected pulse width. Stage 30 senses the rate or duty cycle of the input pulses supplied to the input stage 15. Whenever such rate exceeds a maximum limit, stage 30 through stage 25 inhibits the production of output pulses by the output stage 20.

The circuit of the present invention is shown comprising three NPN type transistors 40, 50 and 60 which are included in stages 15, 30 and 20 respectively. Emitters 40*e*, 50*e* and 60*e* are shown connected to a reference potential such as ground. The transistor 40 further comprises a collector 40*c* connected through a resistor 12 to a terminal 14, to which a positive operating potential $V_{cc}$ is applied. A base 40*b* of the transistor 40 is connected through a resistor 16 to a terminal 18, to which a negative operating potential designated $-V_{bb}$ is applied. The base 40*b* is also connected to an input terminal 22 through parallelly connected resistor 24 and capacitor 26, which are also connected to the terminal 14 through a resistor 28.

It is seen by one familiar with the art that in input stage 15 as long as input pulses are not supplied to the input terminal 22, the transistor 40 is in a conducting state so that collector current flows from the positive operating potential $V_{cc}$ to ground, thereby maintaining the potential of the collector at a value slightly above ground potential, hereinafter designated as G+. However, as soon as negative pulses are supplied to the base 40*b* of the transistor 40, the pulses being sufficient to reduce the potential level of the base 40*b* with respect to the emitter 40*e*, the transistor 40 is switched to its cutoff state, so that collector current no longer flows from the positive potential source $V_{cc}$ to ground. Consequently, the potential of the collector 40*c* rises towards the potential level $V_{cc}$, but for a diode 31. The diode 31 has an anode 31*a* which is connected to the collector 40*c* and a cathode 31*c* which is connected to a terminal 35, to which a positive operating potential $V_c$ is applied. The potential $V_c$ is lower than the potential $V_{cc}$ hereinbefore referred to. Thus, it is seen that as the potential of the collector 40*c* attempts to rise above the potential value of $V_c$, the diode 31 becomes forward biased so as to provide a low resistive current-conducting path therethrough. Consequently, the potential of the collector 40*c* is maintained or clamped at a level slightly above the potential $V_c$, which will hereinafter be designated as $V_c^+$.

Figure 2:
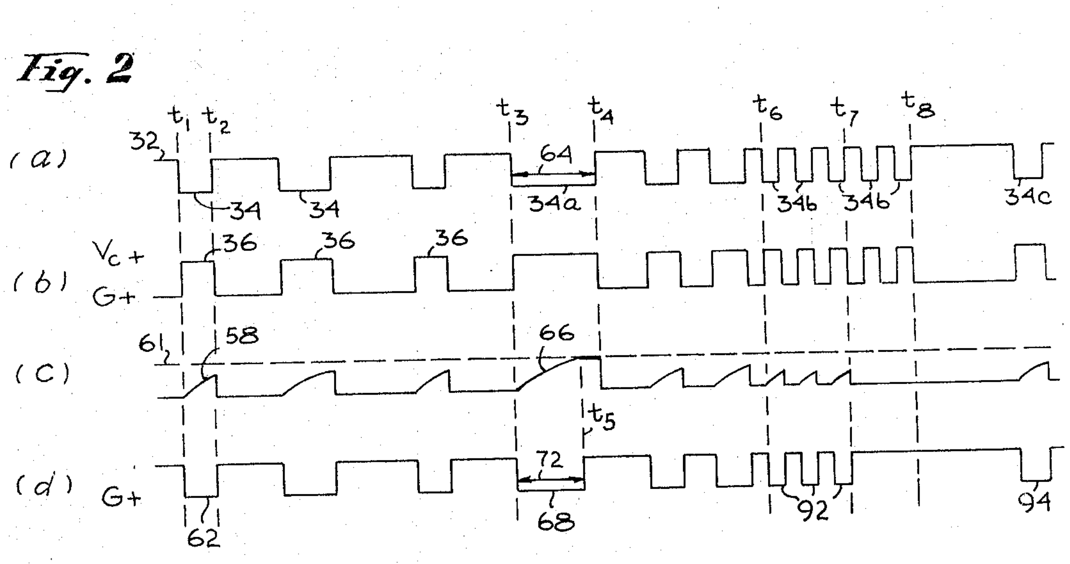
FIGURE 2 is a diagram of waveforms useful in explaining the circuit of the present invention.

The potential variations of the collector 40*c* as a function of negative pulses supplied to the input stage 15 via the input terminal 22 may best be explained in conjunction with lines *a* and *b* of FIGURE 2 to which reference is made herein. In line *a*, a chain 32 of negative pulses 34 is diagrammed. Line *b* represents the potential variations of the collector 40*c*, shown varying between a potential level slightly above $V_c$ designated $V_c^+$, and a potential level $G^+$, assumed to be slightly above ground. In the absence of input pulses 34, the collector 40*c* remains at a potential $G^+$. But during the application of each of the input pulses 34, the level of the collector 40*c* switches to a level $V_c^+$ during the time duration or width of each of the input pulses thus producing related pulses 36. Each of the related pulses 36 has a width substantially equal to the width of the related input pulse, and the rate of related pulses 36 is equal to the rate at which the input pulses 34 are supplied to the input stage 50. Namely, transistor 40 acts as an inverter.

As seen from FIGURE 1, the control stage 25 in addition to diode 31, also comprises a diode 42 having its cathode 42*c* connected to the anode 31*a*. An anode 42*a* of diode 42 is connected to a junction point X which is connected to the terminal point 14 through a resistor 44, and to a base 60*b* of transistor 60 through a capacitor 46. The output stage 20 also comprises a resistor 48 connected between the terminal 14 and a collector 60*c* of the transistor 60, and a resistor 52 connected between the base 60*b* and terminal 18. A diode 54 is connected between the emitter 60*c* and base 60*b* so as to reverse bias the base 60*b* by the forward voltage drop across it.

In operation, current flows from the operating potential $V_{cc}$ through the resistor 44. As long as the diode 42 is forward biased, the current flows therethrough and transistor 40 to ground, rather than through the capacitor 46 to the base 60*b*. When the potential of the collector 40*c* is slightly above ground, namely, in the absence of input pulses, the diode is forward biased so that the potential at the anode 42*a* thereof is also slightly above ground as diagrammed in line *c* of FIGURE 2. Thus, current flows therethrough rather than to the base 60*b*. Consequently, transistor 60 is cut off, with the potential at its collector being approximately equal to $V_{cc}$. The potential variations of collector 60*c* are diagrammed in line *d* of FIGURE 2. However, as soon as the potential of collector 40*c* rises to $V_c^+$, the diode 42 becomes backbiased thereby diverting the current from resistor 44 to flow through the capacitor 46 to the base 60*b*. Such base current charging the capacitor 46, switches transistor 60 to its conducting state so that the potential of the collector 60*c* drops to slightly above ground.

The collector 60*c* remains at such potential so long as current flows to the base thereof through the charging capacitor 44. Such current continues to flow as long as diode 42 is backbiased. However, when the potential of the collector 40*c* drops again to slightly above ground potential, namely, at the end of an input pulse 34, diode 42 is forward biased so that transistor 60 of the output stage 20 is cut off. Similarly, diode 42 is forward biased if, due to an input pulse of excessive width, sufficient time elapses for the capacitor 46 to charge up so that the potential at point X attempts to rise above the $V_c^+$ potential level. In either case, the transistor 60 is cut off, thus terminating the negative pulse produced by the change in potential at the collector thereof.

For a more complete understanding of the present invention, reference is again made to FIGURE 2. Let us assume that at time $t_1$, a first input pulse 34 is supplied, thus raising the potential of collector 40*c* to a level $V_c^+$ (line *b*). As a result, diode 42 is backbiased, causing current to flow to the base 60*b*. Transistor 60 is thus switched to its conducting state, thereby lowering the potential of collector 60*c* (line *d*) to $G^+$. Also, at time $t_1$, capacitor 46 starts to charge up as indicated by line 58 (line *c*). However, if prior to charging up to a potential above $V_c^+$, at which diode 42 may be forward biased, the input pulse 34 terminates at time $t_2$, the potential of collector 40*c* (line *b*) drops back to $G^+$ thereby forward biasing diode 42. Consequently, current to the base 60 is cut off, thereby cutting off transistor 60. As a result, the potential of collector 60*c* (line *d*) rises and capacitor 46 discharges (line *c*) via the diodes 54, 42 and transistor 40 which provide a low impedance discharge path.

It is thus seen that the time duration of the output pulse 62 equals the time duration of pulse width of the input pulse 34. As long as the pulse width of each input pulse is not greater than a time duration during which the capacitor can charge up to a potential slightly above $V_c^+$, which is designated in FIGURE 2 by a dashed line 61, the pulse width of the output pulse is always equal to the pulse width of the input pulse related thereto.

Let us assume however that an input pulse 34*a* which is supplied at time $t_3$, and terminates at time $t_4$ has a pulse width 64. Let us also assume that prior to $t_4$, the capacitor at time $t_5$ charges up to a potential above $V_c^+$ as indicated by line 66 intersecting line 61 at time $t_5$. Then, in light of the foregoing, it is apparent that at time $t_5$, diode 42 will become forward biased thus cutting off the current to the base 60*b*. Consequently, transistor 60 will be cut off at time $t_5$, thereby producing an output pulse 68 which has a pulse width 72, which is shorter than pulse width 64 by a time duration equal to the difference between $t_4$ and $t_5$. Thus, the pulse width 72 is controlled by the time required for capacitor 46 to charge up to a potential slightly above $V_c^+$, which is in turn controlled by the RC time constant of the resistor 44 and capacitor 46. Therefore, by selecting these components to be of particular values, the maximum pulse width of any of the output pulses from stage 20 may be controlled.

From the foregoing, it is thus seen that as long as the time duration of an input pulse is less than the time required to charge capacitor 46 to a potential slightly above $V_c^+$, the time duration of the output pulse is directly related to that of the input pulse. However, if the time duration of the input pulse exceeds the time required for capacitor 46 to charge up to a potential slightly above $V_c^+$, the time duration of the output pulse will nevertheless be limited thereto. Thus, output pulses having time durations or pulse widths which do not exceed a selected limit are produced.

Reference is again made to FIGURE 1 wherein the control stage 30 is shown comprising a collector 50*c* of transistor 50 connected to point X. The transistor also includes a base 50*b* connected through a capacitor 78 to ground, to which an emitter 50*e* is connected. The base 50*b* is connected to the junction point between resistors 82 and 84 which are connected between the collector 40*c* and terminal 18. Resistors 82 and 84 and capacitor 78 act as an integrating network. When the rate at which input pulses are supplied to the input stage 15 increases, the average potential at the collector 40*c* rises. The integrating network is designed so that when such average potential rises above a given limit, transistor 50 conducts, thereby lowering the potential of the collector 50*c* as well as point X to slightly above ground. Consequently, current no longer flows to the base 60*b*, thereby cutting off transistor 60 which prevents the production of additional output signals.

Referring again to FIGURE 2, let us assume that between time $t_6$ and $t_8$ input pulses 34*b* are provided at a high rate, so that the average potential value at collector 40*c* rises. The first few input pulses 34*b* will produce related output pulses 92. However, at some time such as $t_7$, the potential at the base 50*b* will be high enough to cause transistor 50 to conduct, thus pulling point X to slightly above ground, and thereby cutting off transistor 60. Between times $t_7$ and $t_8$, no output pulses are produced even though the circuit 10 is supplied with input pulses.

Transistor 50 will continue to conduct until the rate of input pulses decreases as indicated in line *a* of FIGURE 2 by the absence of input pulses immediately after time $t_8$. The absence of input pulses will lower the average potential at the collector 40*c*, which will also lower the potential at the base 50*b* below a level necessary to sustain transistor 50 to cut off. After transistor 50 is cut off, the circuit 10 is again in a quiescent or normal operating state so that when an input pulse 34*c* is supplied, a related output pulse 94 may be produced in a manner as hereinbefore described.

From the foregoing, it is seen that the stage 25 (FIGURE 1) controls the pulse width of each of the output signals to be equal to the pulse width of the related input pulse, but not to exceed a maximum time width which is controlled by selected values of the resistor 44 and capacitor 46. Thus, stage 25 may be thought of as a pulse width control stage.

On the other hand, stage 30 senses the rate or duty cycle of the input pulses, in order to control the rate of the output pulses, by inhibiting the production of such pulses whenever the rate of the input pulses exceeds a given limit. This limit is controlled by selecting the integrating network of the stage 30 to switch transistor 50 to a conducting state whenever the average potential of the collector 40*c* equals a given value. Thus, stage 30 may be thought of as a pulse rate control stage.

From lines *a* and *d* of FIGURE 2, it is seen that in general, the output pulses are related to the input pulses with the polarity of each output pulse being the same as that of one of the input pulses. Also, the pulse width of each output pulse is related to the width of the corresponding input pulse, but is limited not to exceed a maximum width such as that designated by numeral 72. In addition, when the rate of input pulses exceeds a given limit, the circuit is inhibited from providing any output pulses until the rate of input pulses drops below a maximum limit value.

The circuit of the present invention is particularly useful for protecting transistorized devices as hereinbefore described. For example, the circuit of the invention may be conveniently incorporated in the input stage of a high-powered transistor driver. As a result, the driver is not being energized by pulses such as the input pulses which may exceed a given pulse width or generated at rates exceeding a given limit. Rather, it is energized by the output pulses of the novel circuit of the present invention, so that none of the pulses supplied thereto has a pulse width exceeding the desired limit and the pulses are not supplied at an excessive rate.

There has accordingly been shown and described herein, a novel and useful pulsing circuit for providing output pulses at rates not exceeding a selected limiting value, the pulse width of each pulse being related to the pulse width of an input pulse but limited not to exceed a maximum pulse width.

Modification and equivalents may be introduced in the circuit as shown without departing from the true spirit of the invention. Therefore, all such modifications and equivalents are deemed to fall within the scope of the invention as claimed in the appended claims.

What is claimed is:

1. In a pulsing circuit wherein output means provide output pulses in response to input pulses of varying time durations supplied to input means, at an irregular rate, the improvement comprising: means coupled to said input means and to said output means, including first means responsive to the input pulses for controlling said output means to provide output pulses, each with a time duration related to the time duration of one of said input pulses but not to exceed a predetermined time duration; and second means coupled to said first and output means and responsive to said input pulses for inhibiting said output means from providing output pulses whenever the rate at which input pulses are supplied to said input means exceeds a selected limit.

2. In a circuit wherein output pulses from an output stage are provided in response to input pulses of varying time durations supplied to an input stage at an irregular rate, an arrangement for limiting the time duration of each of said output pulses not to exceed a maximum value irrespective of the time durations of said input pulses and for limiting the rate at which said output pulses are produced when the rate at which said input pulses are supplied exceeds a predetermined value comprising: time duration limiting means connected to said input stage and to said output stage for controlling the time duration of each output pulse produced in response to an input pulse to be equal to the time duration of said input pulse but not to exceed a maximum selected time duration; and pulse rate control means connected to said input stage and to said output stage for inhibiting said output stage from producing said output pulses whenever the rate at which said input pulses are supplied exceeds said predetermined value.

3. In a circuit as recited in claim 2 wherein said time duration limiting means includes electrical storage means for controlling said output stage to provide each of said output signals during a time period which is not greater than a maximum time period, said maximum time period being the time period required for said electrical storage means to charge up to a maximum selected potential value, said maximum time duration of each of said output pulses being equal to said maximum time period.

4. In a circuit as recited in claim 2 wherein said pulse rate control means includes integrating means connected to said input stage for producing an integrated potential level as a function of the rate at which said input pulses are supplied, and means connected to said integrating means and to said output stage to inhibit said output stage from providing said output pulses whenever said integrated potential level exceeds a predetermined level.

5. A pulsing circuit for providing output pulses at a rate not to exceed a predetermined selected value only if the rate at which input pulses supplied thereto does not exceed said selected value comprising: an input stage for providing pulses related to input pulses supplied thereto; an output stage; and a control stage connected to said input stage and to said output stage for inhibiting said output stage from providing output pulses related to said input pulses whenever the rate of said input pulses exceeds said selected value, said control stage including integrating means coupled to said input stage for providing an integrated potential level as a function of the rate of said input pulses, and means coupled to said integrating means and said output stage for inhibiting said output stage from providing said output pulses whenever the integrated potential level exceeds a preselected level.

6. A circuit for providing output pulses in response to input pulses of varying time durations supplied thereto comprising: input means responsive to input pulses supplied thereto for providing related pulses; clamping means for limiting said related pulses not to exceed a first potential level, the time duration of each of said related pulses being related to the time duration of one of said input pulses; electrical storing means; a diode; means connecting said diode between said electrical storing means and said clamping means; means for charging said electrical storing means during the time duration of each of said related pulses to said first potential level; and output means coupled to said electrical storing means for providing output pulses, each having a time duration related to the charging time of said electrical storing means but not exceeding a time duration equal to a time duration required for said electrical storing means to charge up to said first potential level.

7. A circuit as recited in claim 6 further including integrating means coupled to said clamping means for producing an integrated potential level as a function of the rate at which said related pulses are provided; and means coupled to said integrating means and said output means for inhibiting said output means from providing said output pulses, when the integrated potential level exceeds a predetermined level.

8. A circuit for providing output pulses in response to input pulses of varying time durations, supplied at less than a maximum rate, the time duration of each output pulse being related to the time duration of one of said input pulses but not to exceed a maximum time duration comprising: a first transistor stage supplied with said input pulses for providing related pulses; diode means for clamping said related pulses not to exceed a first potential level during the time duration of each of said related pulses; a charging circuit including a capacitor having first and second terminals and a diode having an anode and a cathode, means connecting said first terminal of said capacitor to said anode and said cathode of said diode to said diode means and means connecting said first terminal of said capacitor to a source of potential to charge, said capacitor during at least a part of the time duration of each of said related pulses to a potential level not greater than said first potential level; a second transistor stage connected to the second terminal of said capacitor, responsive to the charging of said capacitor for providing an output pulse when said capacitor is charged, the time duration of each output pulse being limited to the time said capacitor is chargeable to said first potential level; integrating means coupled to said first transistor stage and said diode for producing an integrated potential level as a function of the rate at which said related pulses are provided by said first transistor stage; and a third transistor stage energizable by said integrated potential level when said latter referred to level exceeds a predetermined value for inhibiting said second transistor stage from providing said output pulses.

References Cited by the Examiner

UNITED STATES PATENTS

| | | | |
|---|---|---|---|
| 2,995,710 | 8/1961 | Beesley | 328—58 |
| 3,130,327 | 4/1964 | Krossa et al. | 307—88.5 |
| 3,173,025 | 3/1965 | Davidson | 307—88.5 |
| 3,187,202 | 6/1965 | Case | 307—88.5 |
| 3,191,066 | 6/1965 | Staudenmayer | 307—88.5 |
| 3,231,823 | 1/1966 | Garfield et al. | 328—165 |

ARTHUR GAUSS, *Primary Examiner.*

J. ZAZWORSKY, *Assistant Examiner.*